US010860535B1

(12) United States Patent
Thiyagarajan et al.

(10) Patent No.: US 10,860,535 B1
(45) Date of Patent: Dec. 8, 2020

(54) SYSTEMS AND METHODS FOR UTILIZING MACHINE LEARNING AND NATURAL LANGUAGE PROCESSING TO PROVIDE A DUAL-PANEL USER INTERFACE

(71) Applicant: Verizon Patent and Licensing Inc., Arlington, VA (US)

(72) Inventors: Saivivek Thiyagarajan, Ashburn, VA (US); Praveen K Muthu, Aldie, VA (US); Pradeep Bharthur Shanthraj, Edison, NJ (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/427,849

(22) Filed: May 31, 2019

(51) Int. Cl.
| | | |
|---|---|---|
| *G06F 16/16* | (2019.01) | |
| *G06F 16/9032* | (2019.01) | |
| *G06F 16/903* | (2019.01) | |
| *G06N 20/00* | (2019.01) | |
| *G06F 3/0482* | (2013.01) | |

(52) U.S. Cl.
CPC .......... *G06F 16/168* (2019.01); *G06F 3/0482* (2013.01); *G06F 16/90332* (2019.01); *G06F 16/90335* (2019.01); *G06N 20/00* (2019.01)

(58) Field of Classification Search
CPC ...... G06F 3/04842; H04L 67/02; H04L 12/58
See application file for complete search history.

(56) References Cited

U.S. PATENT DOCUMENTS

| | | | |
|---|---|---|---|
| 2012/0272160 A1* | 10/2012 | Spivack | H04L 43/16 715/752 |
| 2013/0024454 A1* | 1/2013 | Dunn | G06F 16/907 707/740 |
| 2014/0033271 A1* | 1/2014 | Barton | H04W 12/06 726/1 |
| 2019/0265865 A1* | 8/2019 | Yaseen | G06F 3/04842 |

* cited by examiner

*Primary Examiner* — Cao H Nguyen

(57) ABSTRACT

A device receives provides content to a client device via a dual-panel user interface that includes a first panel and a second panel. The device receives, from the client device, information indicating a user interaction, and processes the information, with a first model, to determine a question based on the user interaction. The device utilizes natural language processing with the question to determine an intent of the question, and processes the intent of the question, with a second model, to map the intent of the question to a content answer to the question. The device adds additional user information, associated with a user of the client device, to the content answer to generate a personalized content response, and updates the first panel with the personalized content response to generate an updated first panel. The device provides the updated first panel, via the dual-panel user interface, to the client device.

20 Claims, 13 Drawing Sheets

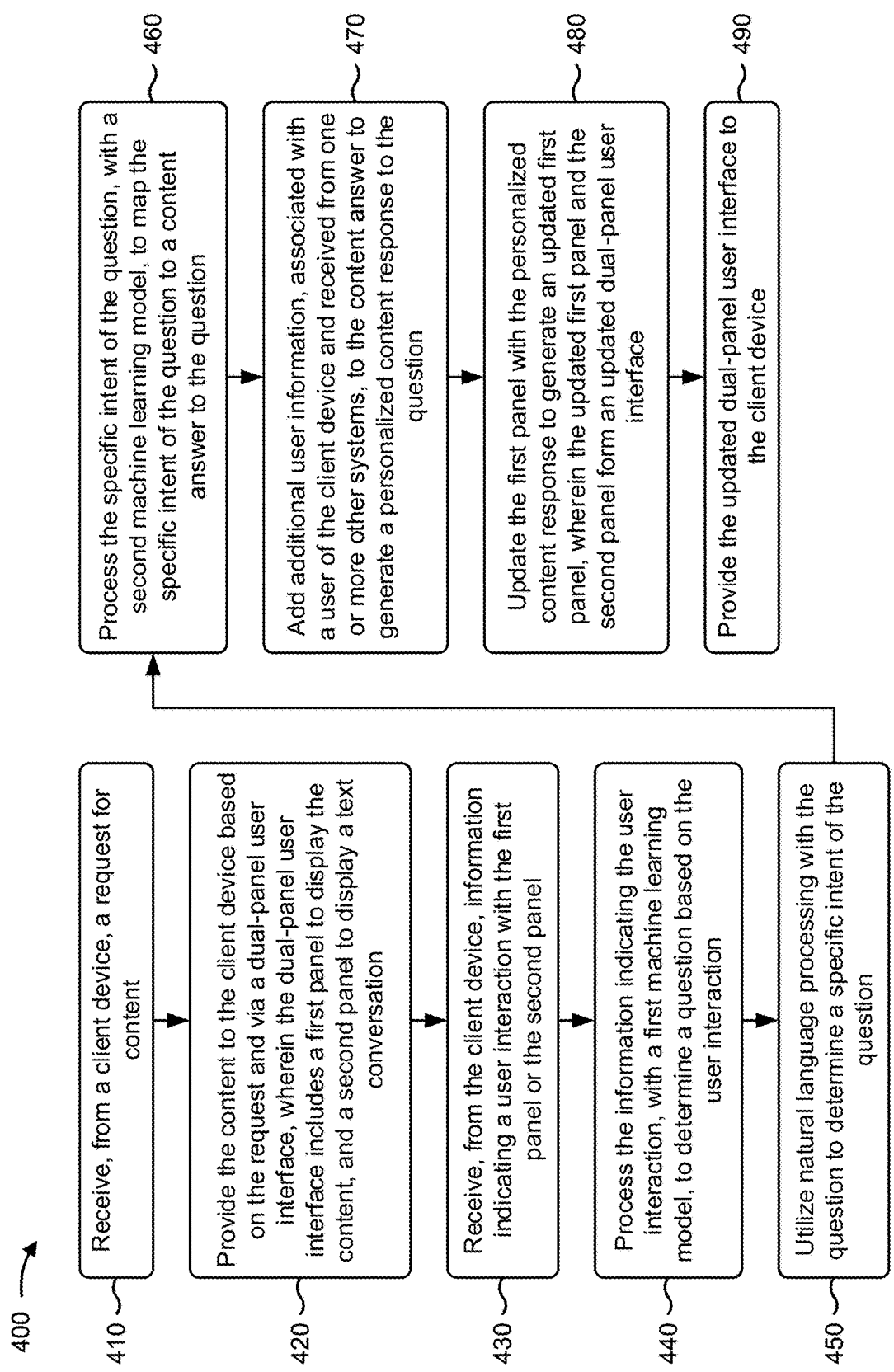

US 10,860,535 B1

SYSTEMS AND METHODS FOR UTILIZING MACHINE LEARNING AND NATURAL LANGUAGE PROCESSING TO PROVIDE A DUAL-PANEL USER INTERFACE

BACKGROUND

In a conventional web page application, a web browser of a client device requests web pages (e.g., of the web page application) from a content server, and the content server provides hypertext markup language (HTML) which renders the web pages in the browser of the client device. A user of the client device may navigate from one web page to another web page based on links provided in the one web page.

BRIEF DESCRIPTION OF THE DRAWINGS

FIG. 4 is a flow chart of an example process for utilizing machine learning and natural language processing to provide a dual-panel user interface.

DETAILED DESCRIPTION OF PREFERRED EMBODIMENTS

Figure 1A:
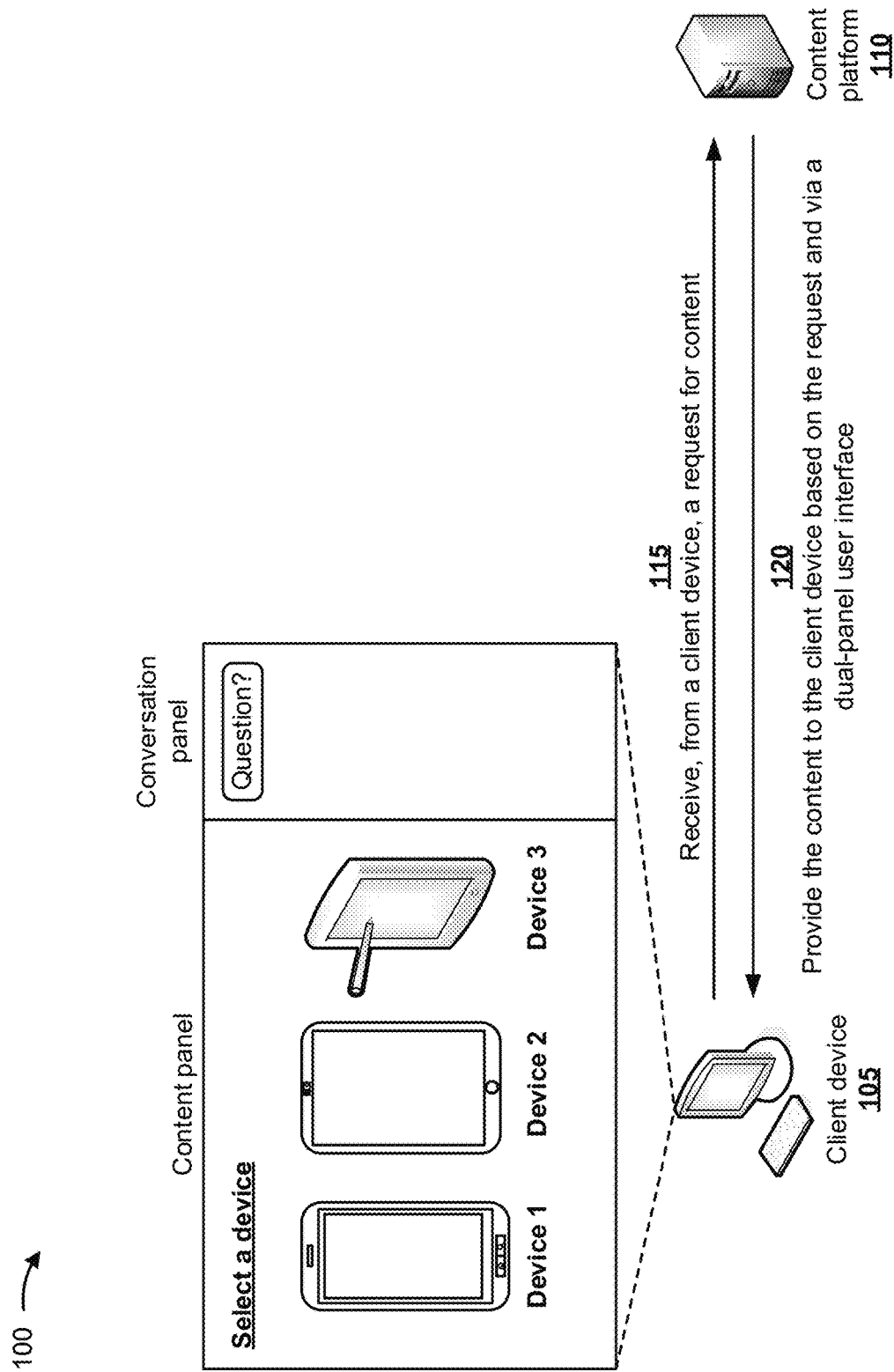
FIGS. 1A-1J are diagrams of one or more example implementations described herein.

The following detailed description of example implementations refers to the accompanying drawings. The same reference numbers in different drawings may identify the same or similar elements.

A user of a web page application (e.g., a browser) may navigate web pages to purchase a product or a service. If the user has questions related to the product or the service, which cannot be answered from the web pages, the user may place a call to a call support center associated with the web pages. However, this results in a high call volume to the call support center, which wastes computing resources (e.g., processing resources, memory resources, and/or the like), networking resources, and/or the like. Furthermore, prior to placing a call to the call support center, the user may spend an inordinate amount of time searching for answers to questions on the web pages, which wastes computing resources, networking resources, and/or the like.

A chatbot may be utilized to attempt to prevent calls to the call support center. The chatbot may receive questions from the user of a browser or the web pages (e.g., about the product or the service) and may provide answers to the questions. However, a chatbot interface consumes space on a web page that overlays and obscures information displayed by the web page. This makes user interaction with the web page difficult and results in a high call volume to the call support center, which wastes computing resources, networking resources, and/or the like.

Some implementations described herein provide a content platform that utilizes machine learning and natural language processing to provide a dual-panel user interface. For example, the content platform may receive, from a client device, a request for content, and may provide the content to the client device based on the request and via a dual-panel user interface that includes a first panel to display the content and a second panel to display a text conversation. The content platform may receive, from the client device, information indicating a user interaction with the first panel or the second panel, and may process the information indicating the user interaction, with a first machine learning model, to determine a request (e.g., a question) based on the user interaction. The content platform may process the question, with a natural language processing model, to determine a specific intent of the question, and may process the specific intent of the question, with a second machine learning model, to map the specific intent of the question to a response (e.g., a text answer) to the question. The content platform may add additional user information, associated with a user of the client device, to the text answer to generate a personalized text response to the question, and may update the second panel with the personalized text response to generate an updated second panel, where the first panel and the updated second panel may form an updated dual-panel user interface. The content platform may provide the updated dual-panel user interface to the client device.

In this way, the content platform provides a dual-panel user interface that includes a first panel for displaying content and a second panel for displaying conversational text that does not overlay and obscure the display of the first panel. The dual-panel user interface enables users to receive answers to questions associated with the content. Thus, the content platform may prevent calls to call support centers, which conserves computing resources (e.g., processing resources, memory resources, and/or the like), networking resources, and/or the like that would otherwise be wasted in answering questions associated with the user interface via the call support centers. The content platform also prevents wasting computing resources, networking resources, and/or the like associated with unsuccessfully attempting to determine answers to questions via web pages of a web site.

FIGS. 1A-1J are diagrams of one or more example implementations 100 described herein. As shown in FIG. 1A, a client device 105 may be associated with a content platform 110. In some implementations, a user of client device 105 may utilize client device 105 to access content (e.g., web pages) provided by content platform 110. The web pages may include content associated with one or more products, one or more services, a combination of one or more products and one or more services, and/or the like.

As further shown in FIG. 1A, and by reference number 115, content platform 110 may receive, from client device 105, a request for content. In some implementations, the user of client device 105 may utilize client device 105 to generate the request for the content (e.g., a web page associated with a web site). For example, the user may input a uniform resource locator (URL) associated with the web site into a browser application of client device 105, and client device 105 may generate the request for the content based on the URL.

As further shown in FIG. 1A, and by reference number 120, content platform 110 may provide the content to client device 105 based on the request and via a dual-panel user interface. In some implementations, content platform 110 may generate the dual-panel user interface based on the request, and may provide the dual-panel user interface to client device 105. In some implementations, the request for the content may include information indicating that the user of client device 105 desires to be guided (e.g., has questions about the content), and content platform 110 may generate the dual-panel user interface based on the information indicating that the user of client device 105 desires to be guided. In some implementations, the request for the content may include a query provided by the user of client device

105, and content platform 110 may generate the dual-panel user interface based on the query provided by the user of client device 105.

Client device 105 may receive the content provided via the dual-panel user interface and may display the dual-panel user interface to the user of client device 105. In some implementations, the dual-panel user interface may include a first panel (e.g., a content panel) that displays the content (e.g., information associated with smartphones) and a second panel (e.g., a conversation panel) that displays a text conversation. In some implementations, the conversation panel may display textual conversations (e.g., questions and answers) between a chatbot (e.g., associated with content platform 110) and the user of client device 105. In some implementations, the conversation panel may be sized and arranged so that the conversation panel does not overlay and obscure the content displayed in the content panel. In some implementations, the content panel may be designed to permit the user of client device 105 to interact with the content panel (e.g., via gestures, inputs, and/or the like), and the conversation panel may be designed to permit the user of client device 105 to provide queries via the conversation panel.

In this way, the dual-panel user interface may enable the user of client device 105 to ask questions and receive answers to the questions without the content displayed in the content panel being obscured.

Figure 1B:
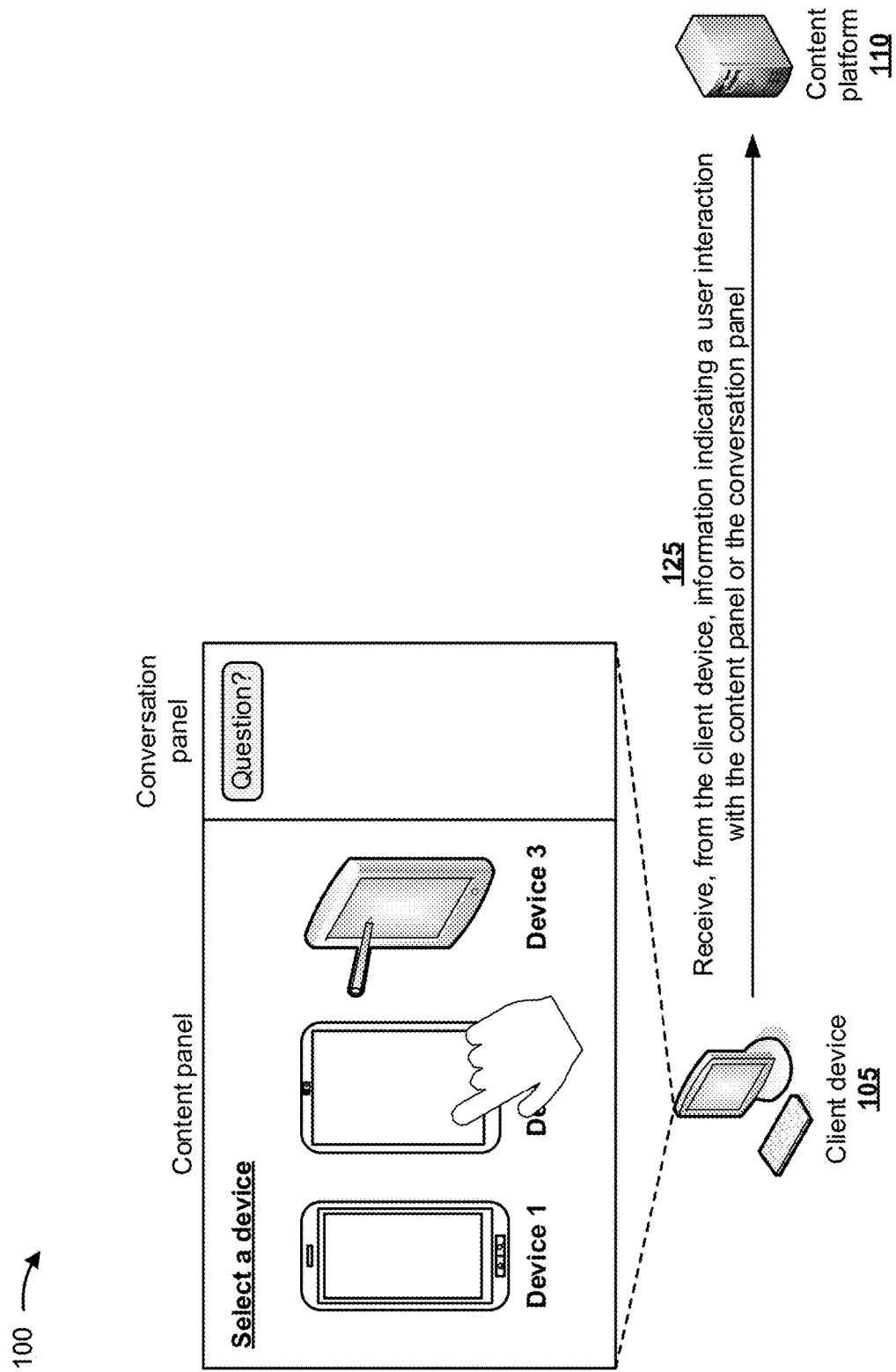

As shown in FIG. 1B, and by reference number 125, content platform 110 may receive, from client device 105, information indicating a user interaction with the content panel or the conversation. In some implementations, the user interaction may include the user of client device 105 interacting with the content panel via a gesture (e.g., swipe, a tap, and/or the like), the user of client device 105 interacting with the content panel via an input component of client device 105 (e.g., selecting a link, selecting an icon, selecting a dropdown menu, and/or the like), the user of client device 105 providing a voice input via the content panel, the user of client device 105 interacting with the conversation panel via a gesture, the user of client device 105 inputting a query via the conversation panel, the user of client device 105 providing a voice input via the conversation panel, and/or the like. For example, the user of client device 105 may select, via the content panel, a dropdown menu associated with prices, brands, carriers, and/or the like of the smartphones and may select an option to sort a display of the smartphones by prices, brands, carriers, and/or the like. In another example, the user of client device 105 may input, via the conversation panel, a question regarding prices, brands, carriers, and/or the like of the smartphones.

Figure 1C:
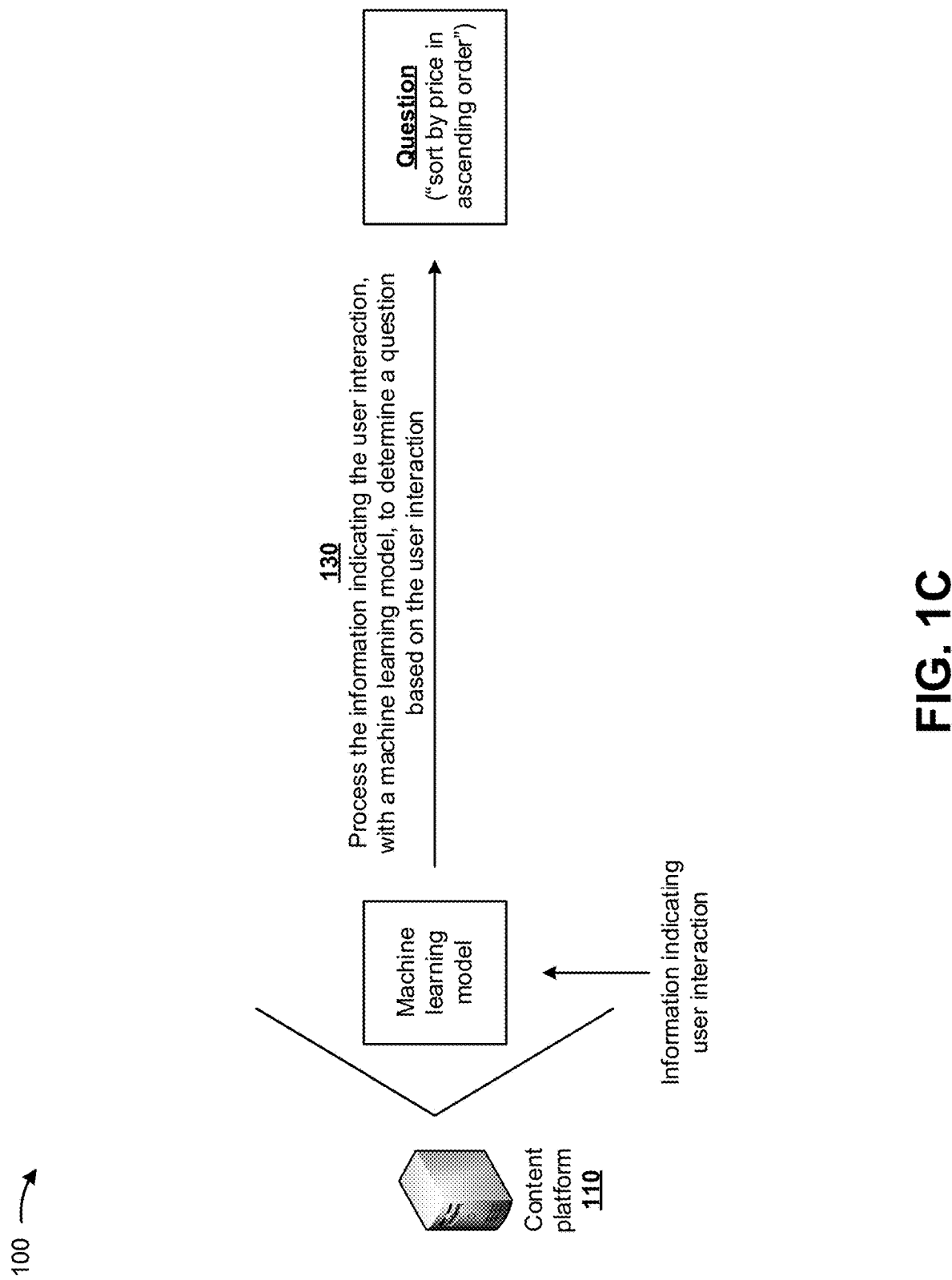

As shown in FIG. 1C, and by reference number 130, content platform 110 may process the information indicating the user interaction with the content panel or the conversation panel, with a machine learning model, to determine a question based on the user interaction. In some implementations, the machine learning model may be trained to predict a question based on the user interaction with the content panel or the conversation panel. For example, content platform 110 may train the machine learning model to predict a question based on the user interaction with the content panel or the conversation panel.

In some implementations, content platform 110 may train the machine learning model, with historical information indicating user interactions, to identify questions indicated by the user interactions. For example, content platform 110 may separate the historical information indicating user interactions into a training set, a validation set, a test set, and/or the like. The training set may be utilized to train the machine learning model. The validation set may be utilized to validate results of the trained machine learning model. The test set may be utilized to test operation of the machine learning model.

In some implementations, content platform 110 may train the machine learning model using, for example, an unsupervised training procedure and based on the historical information indicating user interactions. For example, content platform 110 may perform dimensionality reduction to reduce the historical information to a minimum feature set, thereby reducing resources (e.g., processing resources, memory resources, and/or the like) to train the machine learning model, and may apply a classification technique to the minimum feature set.

In some implementations, content platform 110 may use a logistic regression classification technique to determine a categorical outcome (e.g., that particular historical information indicates particular questions). Additionally, or alternatively, content platform 110 may use a naïve Bayesian classifier technique. In this case, content platform 110 may perform binary recursive partitioning to split the historical information indicating user interactions into partitions and/or branches and use the partitions and/or branches to determine outcomes (e.g., that particular historical information indicates particular questions). Based on using recursive partitioning, content platform 110 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, content platform 110 may use a support vector machine (SVM) classifier technique to generate a non-linear boundary between data points in the training set. In this case, the non-linear boundary is used to classify test data into a particular class.

Additionally, or alternatively, content platform 110 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, content platform 110 may use one or more other model training techniques, such as a neural network technique, a latent semantic indexing technique, and/or the like. For example, content platform 110 may perform an artificial neural network processing technique (e.g., using a two-layer feedforward neural network architecture, a three-layer feedforward neural network architecture, and/or the like) to perform pattern recognition with regard to patterns of the historical information indicating user interactions. In this case, using the artificial neural network processing technique may improve an accuracy of the trained machine learning model generated by content platform 110 by being more robust to noisy, imprecise, or incomplete data, and by enabling content platform 110 to detect patterns and/or trends undetectable to human analysts or systems using less complex techniques.

Figure 1D:
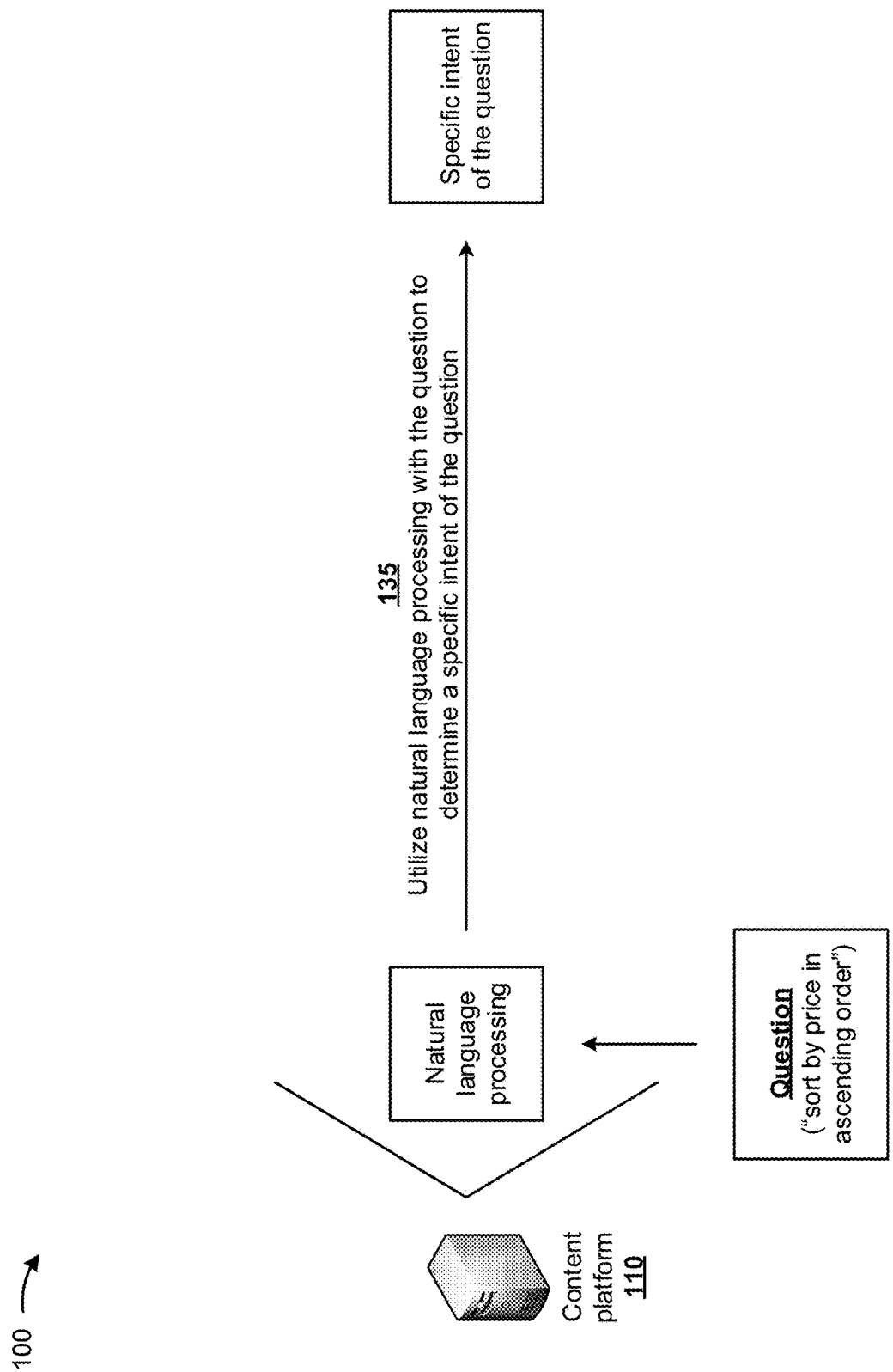

As shown in FIG. 1D, and by reference number 135, content platform 110 may utilize natural language processing with the question to determine a specific intent of the question. For example, a question (e.g., "can you sort products by price in ascending order?") may include a specific intent (e.g., "sorting products by price in ascending order"), such that a product with a smallest price may be listed first, a product with a next smallest price may be listed second, and/or the like. Natural language processing may include a science of extracting an intent of text (e.g., a question). An intent may include an intention of an end-user that is conveyed by the end-user to a chatbot, such as, for example, a casual intent, a business intent, and/or the like. A casual intent may include an opening or a closing of a conversation (e.g., greetings such as "hi," "hello," "hola," "ciao," "bye," and/or the like). A casual intent may direct a chatbot to respond with a reply such as "hello, what can I do for you today" or "bye, thanks for talking to me." A casual intent may also include affirmative and negative intents for utterances (e.g., "ok," "yes please," "no not this one but the first one," "nope," and/or the like). A business intent may include an intent that directly maps to a business associated with a chatbot. For example, if the chatbot is associated with movie information, then an utterance from user (e.g., "when was this movie released?") may be a business intent that intends to determine a release year of the movie.

In some implementations, content platform 110 may utilize a natural language processing model or technique, a computational linguistics technique, a text analysis technique, and/or the like, with the question in order to determine the specific intent of the question. For example, content platform 110 may apply natural language processing to interpret the question and generate additional information associated with the potential meaning of information within the question. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

Figure 1E:
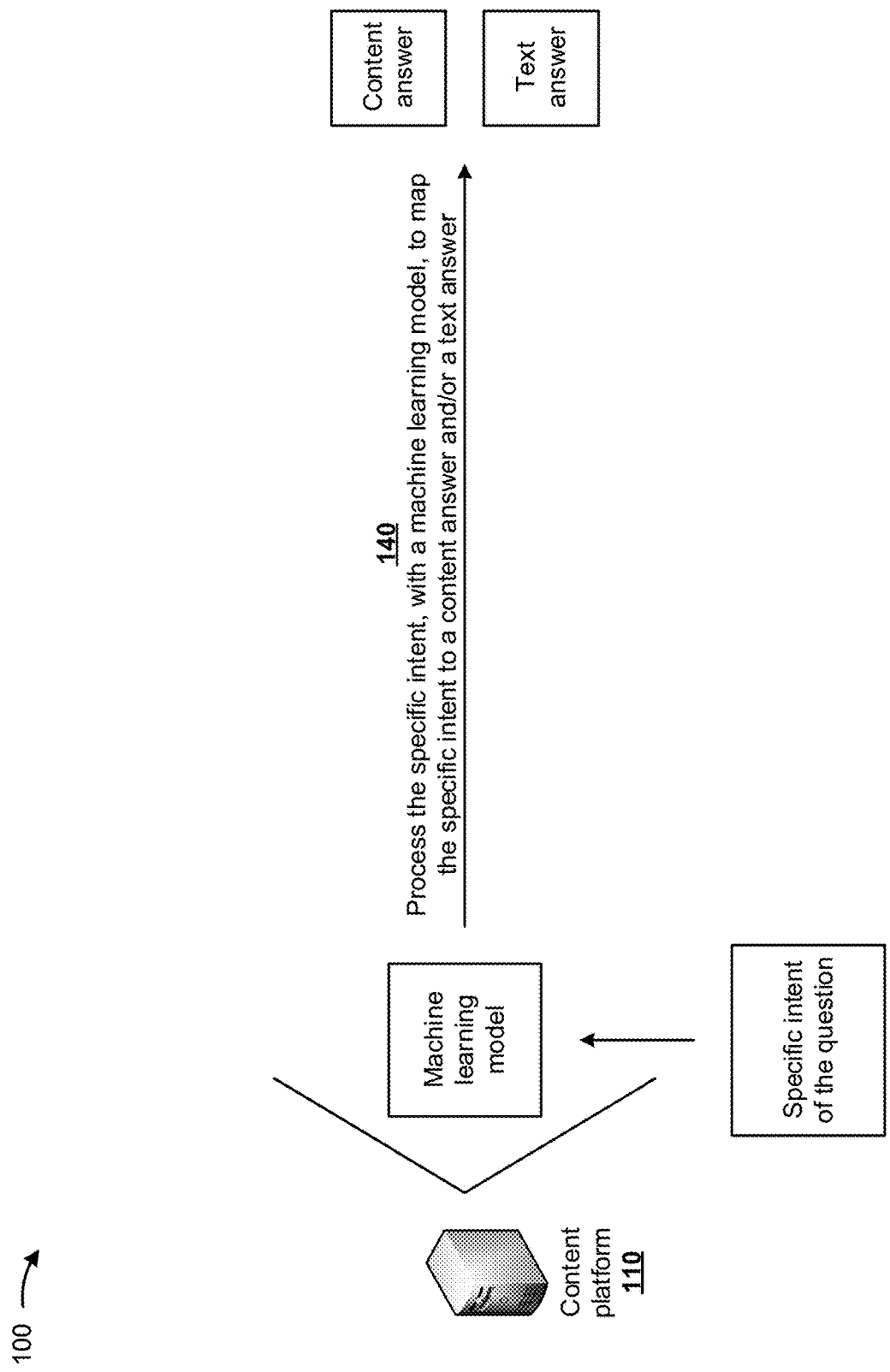

As shown in FIG. 1E, and by reference number 140, content platform 110 may process the specific intent of the question, with a machine learning model, to map the specific intent to a content answer and/or a text answer. In some implementations, the content answer may include a template content answer in an HTML (e.g., web page) format (e.g., for display in the content panel), and the text answer may include a template text answer in a textual format (e.g., for display in the conversation panel). In some implementations, content platform 110 may determine multiple template content answers for multiple intents. In such implementations, the machine learning model may identify the specific intent in the multiple intents, and may determine the content answer, from the multiple template content answers, that corresponds with the specific intent. In some implementations, content platform 110 may determine multiple template text answers for the multiple intents. In such implementations, the machine learning model may identify the specific intent in the multiple intents, and may determine the text answer, from the multiple template text answers, that corresponds with the specific intent.

In some implementations, the machine learning model may be trained to map a specific intent to a content answer and/or a text answer. For example, content platform 110 may train the machine learning model to map a specific intent to a content answer and/or a text answer. The machine learning model may be trained as described above in connection with FIG. 1C.

Figure 1F:
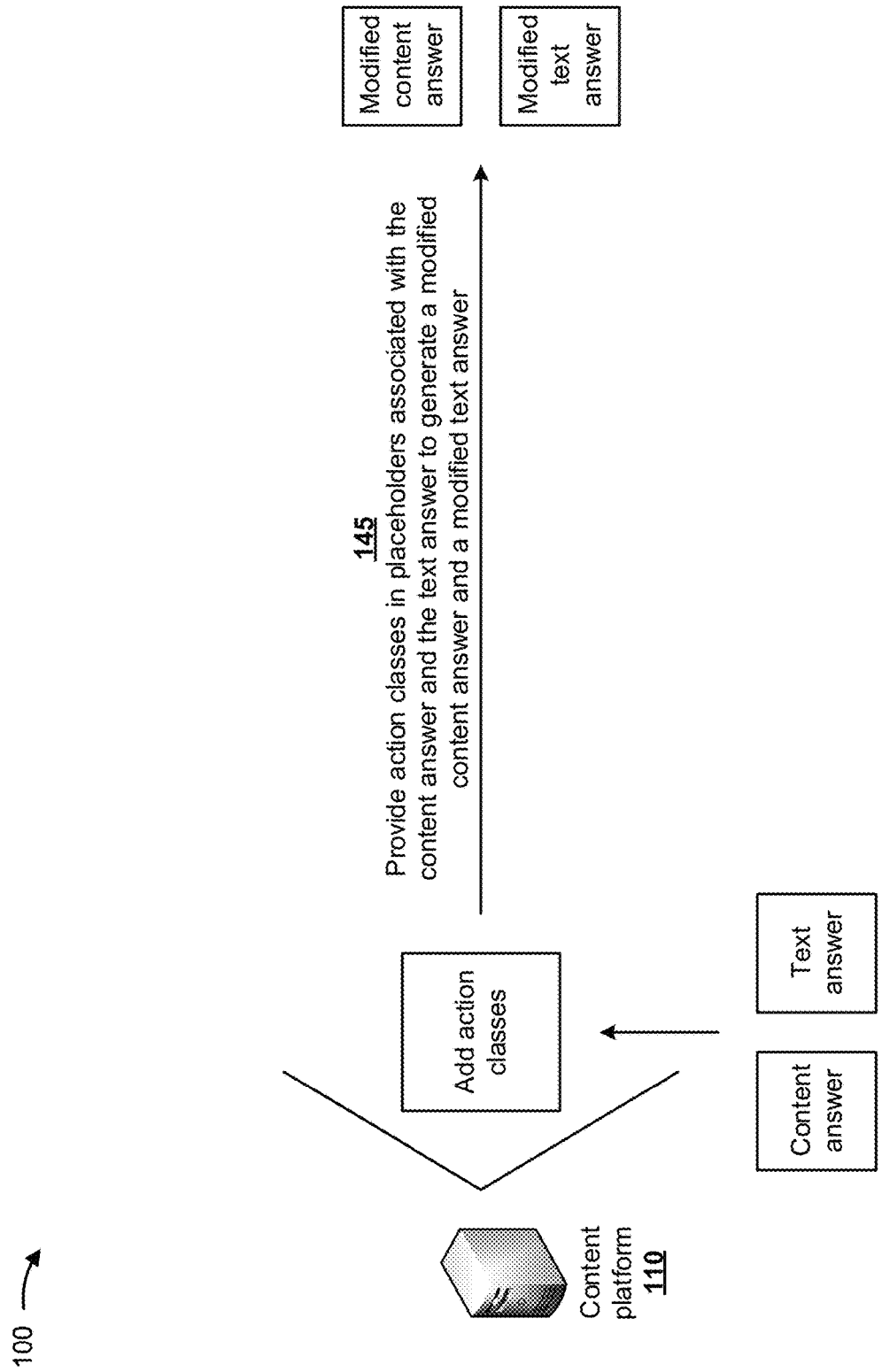

As shown in FIG. 1F, and by reference number 145, content platform 110 may provide action classes in placeholders associated with the content answer and the text answer to generate a modified content answer and a modified text answer. In some implementations, the content answer (e.g., a template content answer) and the text answer (e.g., a template text answer) may include placeholders for receiving the action classes. An action class may act as a wrapper around logic and may provide an interface for receiving information. An action class may work as an adapter between content of an incoming request and logic that corresponds to the incoming request.

Figure 1G:
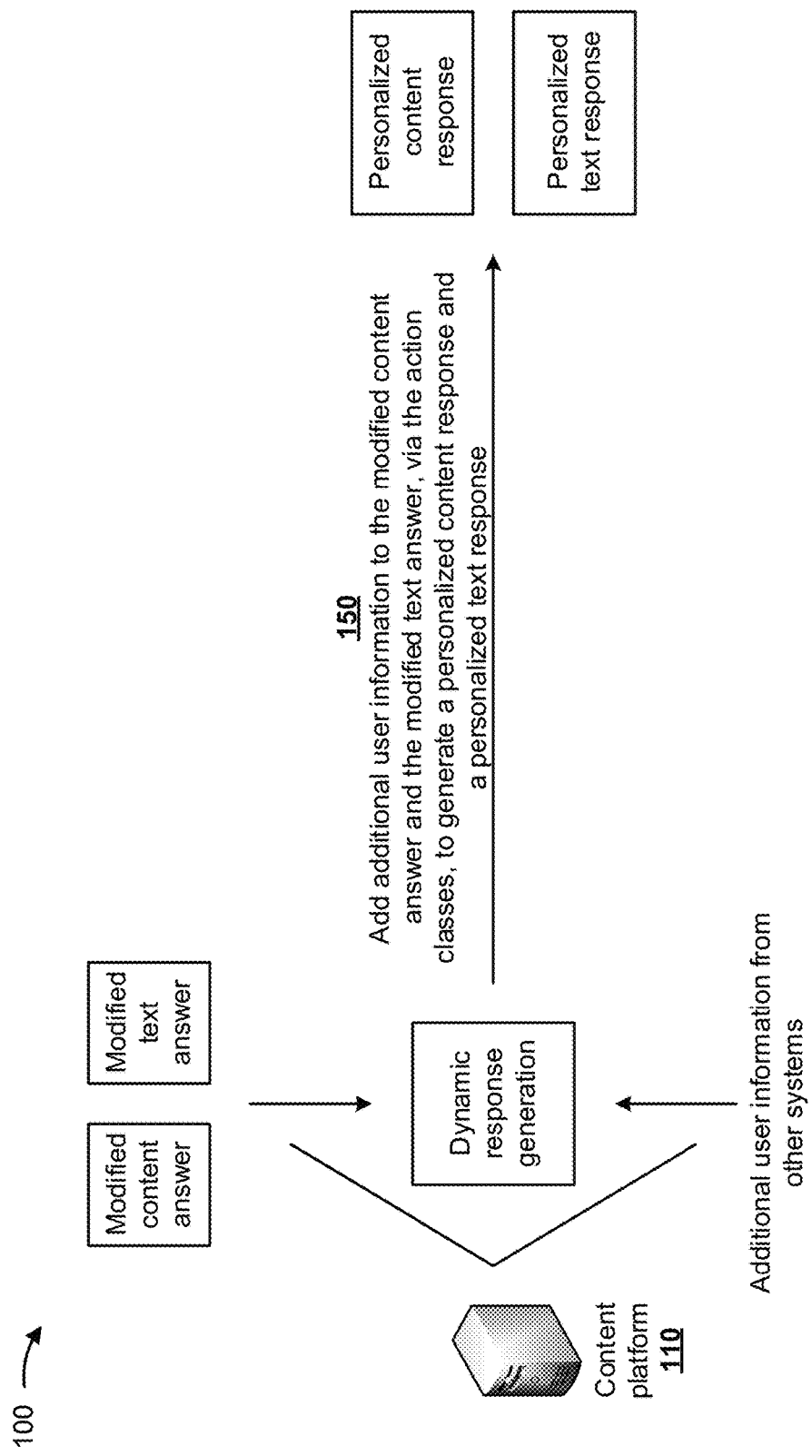

As shown in FIG. 1G, and by reference number 150, content platform 110 may add additional user information to the modified content answer and the modified text answer, via the action classes, to generate a personalized content response and a personalized text response. In some implementations, the additional user information may include information associated with the user of client device 105 and may be received from one or more other systems (e.g., point-of-sale (POS) systems, a billing system, a financial institution system, a user profile system, and/or the like). For example, the additional user information may include information identifying a name of the user, an account of the user, a current product and/or service utilized by the user, and/or the like. The action classes included in the modified content answer may enable content platform 110 to add the additional user information in the modified content answer and to personalize the modified content answer (e.g., to generate the personalized content response). The action classes included in the modified text answer may enable content platform 110 to add the additional user information in the modified text answer and to personalize the modified text answer (e.g., to generate the personalized text response).

Figure 1H:
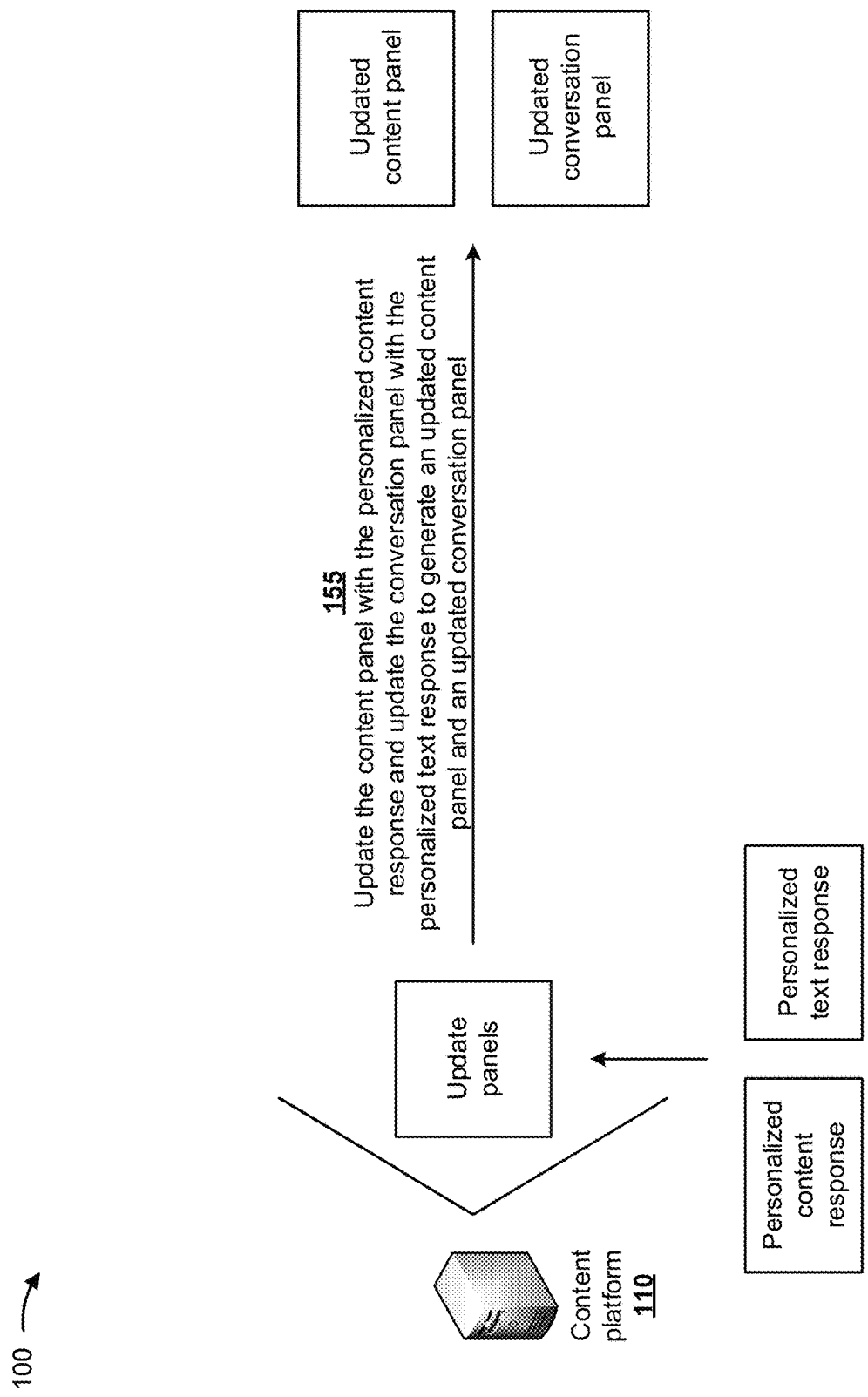

As shown in FIG. 1H, and by reference number 155, content platform 110 may update the content panel with the personalized content response and may update the conversation panel with the personalized text response to generate an updated content panel and an updated conversation panel. In some implementations, the updated content panel and the updated conversation panel may form an updated dual-panel user interface. In some implementations, content platform 110 may determine the content answer or the text answer based on the specific intent, and may generate the personalized content response or the personalized text response, as described above. In such implementations, content platform 110 may update the content panel with the personalized content response to generate the updated content panel or may update the conversation panel with the personalized text response to generate the updated conversation panel. The updated content panel and/or the updated conversation panel may be utilized to form the updated dual-panel user interface.

Figure 1I:
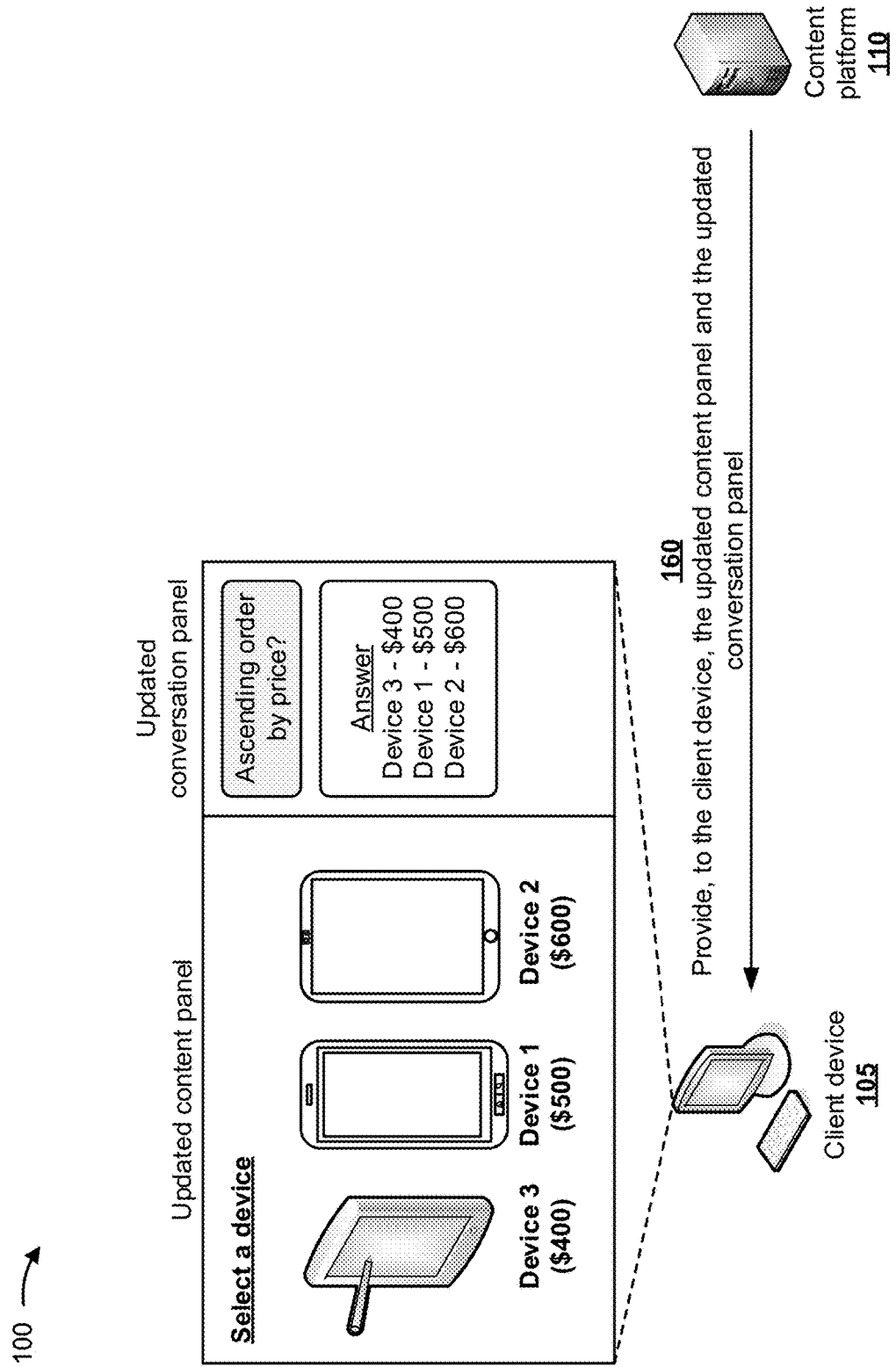

As shown in FIG. 1I, and by reference number 160, content platform 110 may provide, to client device 105, the updated content panel and the updated conversation panel (e.g., the updated dual-panel user interface). In some implementations, the updated dual-panel user interface may include the updated content panel and/or the updated conversation panel. Client device 105 may receive the updated dual-panel user interface and may display the updated dual-panel user interface to the user of client device 105. For example, as further shown in FIG. 1I, the updated content panel may arrange images of the smartphones by price in ascending order, and the updated conversation panel may include an answer listing the smartphones by price in ascending order.

Figure 1J:
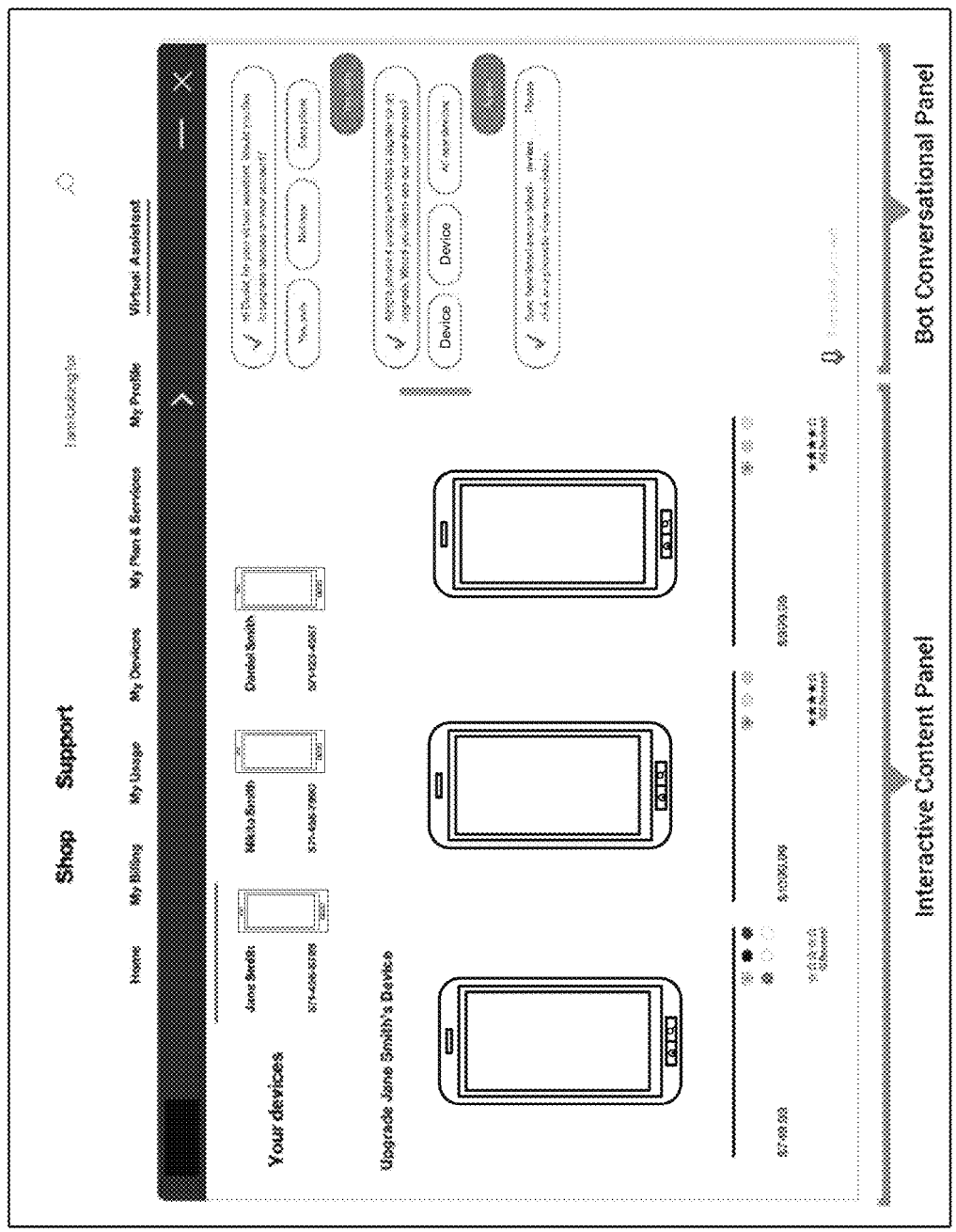

As shown in FIG. 1J, the updated dual-panel user interface may include an interactive content panel (e.g., the updated content panel) and a bot conversational panel (e.g., the updated conversation panel). The interactive content panel may display information associated with smartphones, such as currently owned smartphones, upgrade smartphones, and/or the like. The bot conversational panel may display information associated with a conversation between the user of client device 105 and a chatbot provided by content platform 110.

In some implementations, content platform 110 may receive, from client device 105, a request to speak with a live person, and may connect client device 105 and another client device 105 associated with the live person, via a call, based on the request to speak with the live person. Content platform 110 may provide, to the other client device 105 associated with the live person, information received via the content panel and the conversation panel of the dual-panel user interface.

In some implementations, the user of client device 105 may view data usage web pages of a web site, and content platform 110 may prompt a query regarding whether the user needs help in choosing a data plan. If the user elects to be guided, content platform 110 may provide the dual-panel user interface to client device 105. Data plans suited for the user may be displayed in the content panel. As the user selects a data plan, details, features, and/or pricing may be displayed for the user to compare an existing plan and a proposed plan. The conversation panel may aid the user in completing the task of selecting a data plan via a call center environment conversation.

In some implementations, the user of client device 105 may view a web site to determine whether a phone line is eligible for a phone upgrade. Content platform 110 may transition the user to the dual-panel user interface and may provide for display of new phones based on a purchase history of the user. The user may select one of the new phones but may not share credit card information with the chatbot. The chatbot may query whether the user would like to be transferred to a live agent. The chatbot and the user conversation history may be made available to the live agent and the live agent may complete the transaction.

In some implementations, content platform 110 may create a call center environment conversation that solves all types of user concerns on a single user interface. Content platform 110 may render rich media interactive widgets on multiple devices and/or platforms and may create intelligent and complex conversational flows to solve user queries.

In this way, several different stages of the process for providing a dual-panel user interface are automated via machine learning and natural language processing, which may remove human subjectivity and waste from the process, and which may improve speed and efficiency of the process and conserve computing resources (e.g., processing resources, memory resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and natural language processing to provide a dual-panel user interface. Finally, the process for providing a dual-panel user interface conserves computing resources (e.g., processing resources, memory resources, and/or the like), networking resources, and/or the like that would otherwise be wasted in attempting to obtain answers to questions via a web page and/or a call support center.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
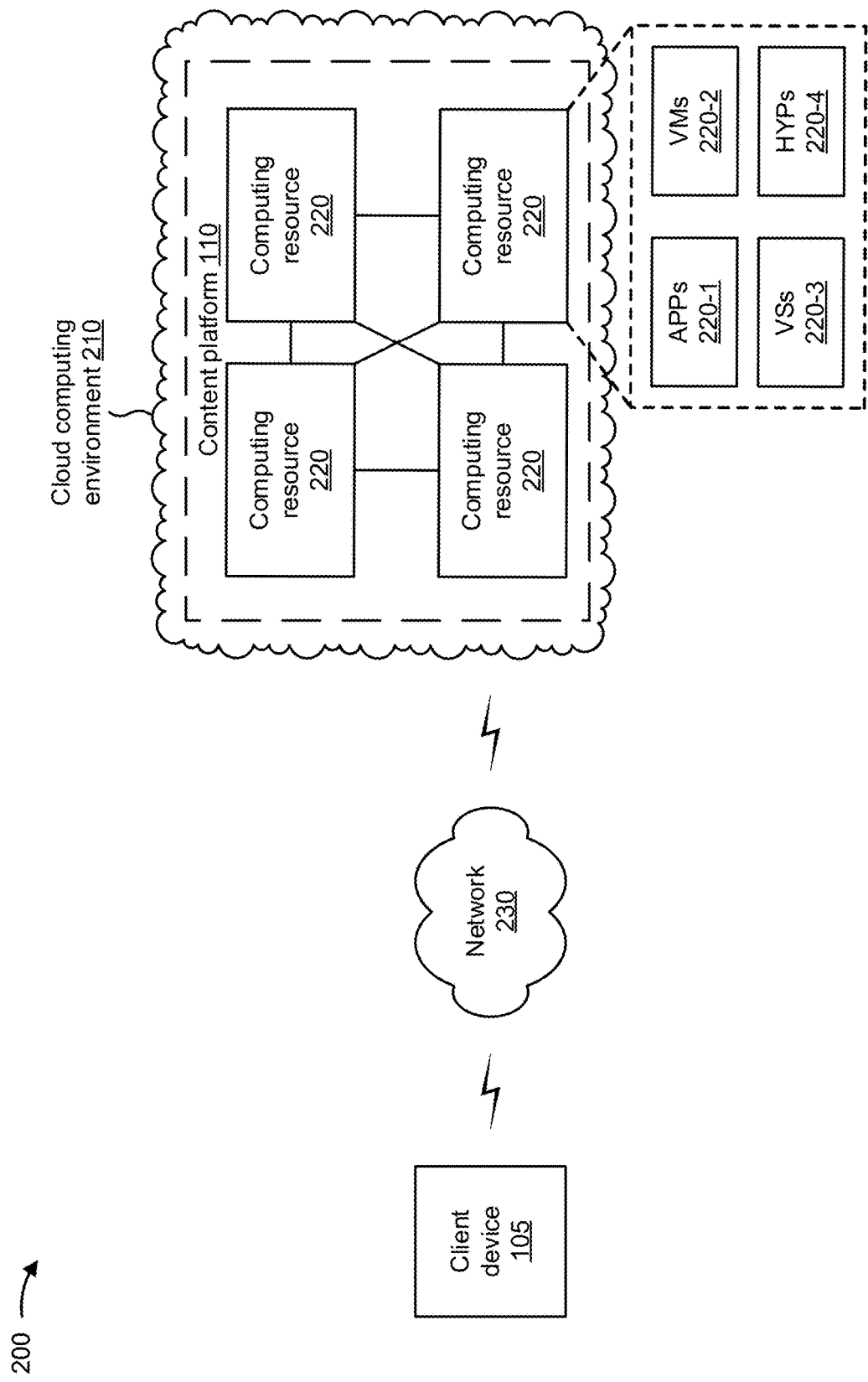
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, a content platform 110, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 105 may receive information from and/or transmit information to content platform 110.

Content platform 110 includes one or more devices that utilize machine learning and natural language processing to provide a dual-panel user interface. In some implementations, content platform 110 may be designed to be modular such that certain software components may be swapped in or out depending on a particular need. As such, content platform 110 may be easily and/or quickly reconfigured for different uses. In some implementations, content platform 110 may receive information from and/or transmit information to one or more client devices 105.

In some implementations, as shown, content platform 110 may be hosted in a cloud computing environment 210. Notably, while implementations described herein describe content platform 110 as being hosted in cloud computing environment 210, in some implementations, content platform 110 may not be cloud-based (i.e., may be implemented outside of a cloud computing environment) or may be partially cloud-based.

Cloud computing environment 210 includes an environment that hosts content platform 110. Cloud computing environment 210 may provide computation, software, data access, storage, etc., services that do not require end-user knowledge of a physical location and configuration of system(s) and/or device(s) that hosts content platform 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host content platform 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with content platform 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of content platform 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
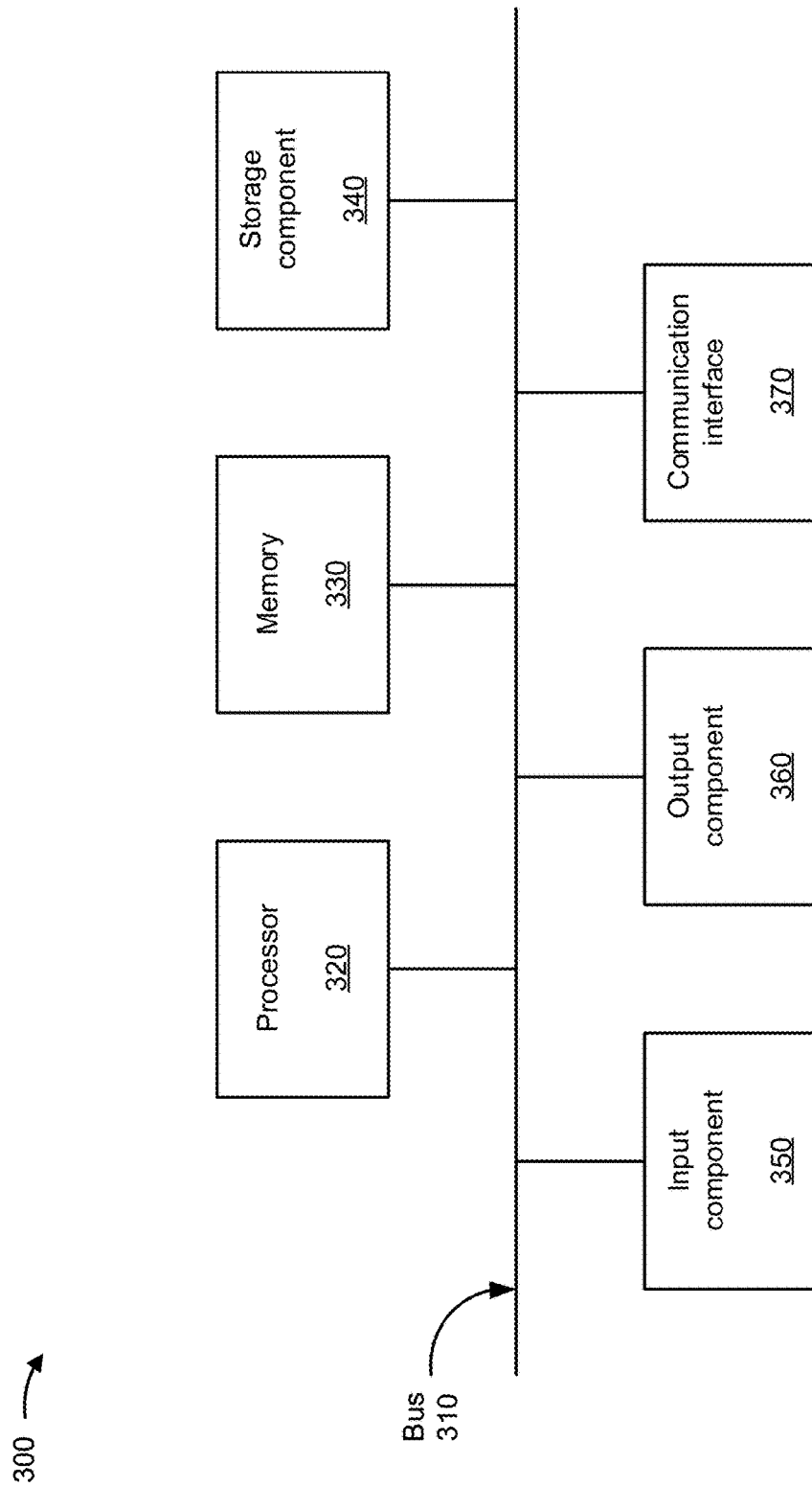
FIG. 3 is a diagram of example components of one or more devices of FIG. 2.

FIG. 3 is a diagram of example components of a device 300. Device 300 may correspond to client device 105, content platform 110, and/or computing resource 220. In some implementations, client device 105, content platform 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning and natural language processing to provide a dual-panel user interface. In some implementations, one or more process blocks of FIG. 4 may be performed by a content platform (e.g., content platform 110). In some implementations, one or more process blocks of FIG. 4 may be performed by another device or a group of devices separate from or including the content platform, such as a client device (e.g., client device 105).

As shown in FIG. 4, process 400 may include receiving, from a client device, a request for content (block 410). For example, the content platform (e.g., using computing resource 220, processor 320, communication interface 370, and/or the like) may receive, from a client device, a request for content, as described above in connection with FIGS. 1A-3.

In some implementations, the first panel may display information associated with at least one of one or more products or one or more services, and the second panel may display textual conversations between a chatbot and the user of the client device. The first panel of the dual-panel user interface may be designed to permit the user of the client device to interact with the first panel of the dual-panel user interface, and the second panel of the dual-panel user interface may be designed to permit the user of the client device to provide queries via the second panel of the dual-panel user interface.

In some implementations, when the request for the content includes information indicating that the user of the client device desires to be guided, the content platform may generate the dual-panel user interface based on the information indicating that the user of the client device desires to be guided. In some implementations, when the request for the content includes a query provided by the user of the client device, the content platform may generate the dual-panel user interface based on the query provided by the user of the client device.

As further shown in FIG. 4, process 400 may include providing the content to the client device based on the request and via a dual-panel user interface, wherein the dual-panel user interface includes a first panel to display the content, and a second panel to display a text conversation (block 420). For example, the content platform (e.g., using computing resource 220, processor 320, memory 330, communication interface 370, and/or the like) may provide the content to the client device based on the request and via a dual-panel user interface, as described above in connection with FIGS. 1A-3. In some implementations, the dual-panel user interface may include a first panel to display the content and a second panel to display a text conversation.

As further shown in FIG. 4, process 400 may include receiving, from the client device, information indicating a user interaction with the first panel or the second panel (block 430). For example, the content platform (e.g., using computing resource 220, processor 320, communication interface 370, and/or the like) may receive, from the client device, information indicating a user interaction with the first panel or the second panel, as described above in connection with FIGS. 1A-3.

In some implementations, the user interaction includes one or more of the user of the client device interacting with the first panel via a first gesture, the user of the client device interacting with the first panel via an input component of the client device, the user of the client device providing a first voice input via the first panel, the user of the client device interacting with the second panel via a second gesture, the user of the client device inputting a query via the second panel, the user of the client device providing a second voice input via the second panel, and/or the like.

As further shown in FIG. 4, process 400 may include processing the information indicating the user interaction, with a first machine learning model, to determine a question based on the user interaction (block 440). For example, the content platform (e.g., using computing resource 220, processor 320, memory 330, and/or the like) may process the information indicating the user interaction, with a first machine learning model, to determine a question based on the user interaction, as described above in connection with FIGS. 1A-3.

As further shown in FIG. 4, process 400 may include utilizing natural language processing with the question to determine a specific intent of the question (block 450). For example, the content platform (e.g., using computing resource 220, processor 320, storage component 340, and/or the like) may utilize natural language processing with the question to determine a specific intent of the question, as described above in connection with FIGS. 1A-3.

As further shown in FIG. 4, process 400 may include processing the specific intent of the question, with a second machine learning model, to map the specific intent of the question to a content answer to the question (block 460). For example, the content platform (e.g., using computing resource 220, processor 320, memory 330, and/or the like) may process the specific intent of the question, with a second machine learning model, to map the specific intent of the question to a content answer to the question, as described above in connection with FIGS. 1A-3.

As further shown in FIG. 4, process 400 may include adding additional user information, associated with a user of the client device and received from one or more other systems, to the content answer to generate a personalized content response to the question (block 470). For example, the content platform (e.g., using computing resource 220, processor 320, storage component 340, communication interface 370, and/or the like) may add additional user information, associated with a user of the client device and received from one or more other systems, to the content answer to generate a personalized content response to the question, as described above in connection with FIGS. 1A-3.

In some implementations, the content platform may provide action classes in placeholders associated with the content answer to generate a modified content answer, and may add the additional user information to the modified content answer, via the action classes, to generate the personalized content response to the question.

As further shown in FIG. 4, process 400 may include updating the first panel with the personalized content response to generate an updated first panel, wherein the updated first panel and the second panel form an updated dual-panel user interface (block 480). For example, the content platform (e.g., using computing resource 220, processor 320, memory 330, and/or the like) may update the first panel with the personalized content response to generate an updated first panel, as described above in connection with FIGS. 1A-3. In some implementations, the updated first panel and the second panel may form an updated dual-panel user interface.

As further shown in FIG. 4, process 400 may include providing the updated dual-panel user interface to the client device (block 490). For example, the content platform (e.g., using computing resource 220, processor 320, communication interface 370, and/or the like) may provide the updated dual-panel user interface to the client device, as described above in connection with FIGS. 1A-3.

Process 400 may include additional implementations, such as any single implementation or any combination of implementations described below and/or in connection with one or more other processes described elsewhere herein.

In some implementations, the content platform may process the specific intent of the question, with the second machine learning model, to map the specific intent of the question to a text answer to the question, may add the additional user information to the text answer to generate a personalized text response to the question, and may update the second panel with the personalized text response to generate an updated second panel, where the updated first panel and the updated second panel form the updated dual-panel user interface.

In some implementations, the content platform may provide action classes in placeholders associated with the text answer to generate a modified text answer, and may add the additional user information to the modified text answer, via the action classes, to generate the personalized text response to the question.

In some implementations, the content platform may determine a plurality of template content answers for a plurality of intents and a plurality of template text answers for the plurality of intents. The content answer may be included in the plurality of template content answers, the text answer may be included in the plurality of template text answers, and the specific intent may be included in the plurality of intents.

In some implementations, the content platform may receive, from the client device, a request to speak with a live person, and may connect the client device and another client device associated with the live person, via a call, based on the request to speak with the live person. The content platform may provide, to the other client device associated with the live person, information received via the first panel and the second panel of the dual-panel user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a client device, a request for content;
providing, by the device, the content to the client device based on the request and via a dual-panel user interface, wherein the dual-panel user interface includes:
a first panel to display the content, and
a second panel to display a text conversation;
receiving, by the device and from the client device, information indicating a user interaction with the first panel or the second panel;
processing, by the device, the information indicating the user interaction, with a first machine learning model, to determine a question based on the user interaction;
utilizing, by the device, natural language processing with the question to determine a specific intent of the question;
processing, by the device, the specific intent of the question, with a second machine learning model, to map the specific intent of the question to a content answer to the question,
the second machine learning model to identify the specific intent included in a plurality of intents and determine the content answer from a plurality of template content answers that correspond with the specific intent;
providing, by the device, one or more action classes in placeholders associated with the content answer to generate a modified content answer,
the one or more action classes to act as a wrap-around logic and provide an interface for receiving information;
adding, by the device, additional user information, associated with a user of the client device and received from one or more other systems, to the modified content answer to generate a personalized content response to the question;
updating, by the device, the first panel with the personalized content response to generate an updated first panel,
wherein the updated first panel and the second panel form an updated dual-panel user interface; and
providing, by the device, the updated dual-panel user interface to the client device.

2. The method of claim 1, further comprising:
processing the specific intent of the question, with the second machine learning model, to map the specific intent of the question to a text answer to the question;
adding the additional user information to the text answer to generate a personalized text response to the question; and
updating the second panel with the personalized text response to generate an updated second panel,
wherein the updated first panel and the updated second panel form the updated dual-panel user interface.

3. The method of claim 2, further comprising:
providing the one or more action classes in placeholders associated with the text answer to generate a modified text answer,
wherein adding the additional user information to the text answer comprises:
adding the additional user information to the modified text answer, via the action classes, to generate the personalized text response to the question.

4. The method of claim 1, further comprising:
determining the plurality of template content answers for the plurality of intents.

5. The method of claim 1, wherein the first panel displays information associated with at least one of:
one or more products, or
one or more services.

6. The method of claim 1, wherein the second panel displays textual conversations between a chatbot and the user of the client device.

7. A device, comprising:
one or more memories; and
one or more processors, communicatively coupled to the one or more memories, to:
receive, from a client device, a request for content;
provide the content to the client device based on the request and via a dual-panel user interface,
wherein the dual-panel user interface includes:
a first panel to display the content, and
a second panel to display a text conversation;
receive, from the client device, information indicating a user interaction with the first panel or the second panel;
process the information indicating the user interaction, with a first model, to determine a question based on the user interaction;
process the question, with a second model, to determine a specific intent of the question;
process the specific intent of the question, with a third model, to map the specific intent of the question to a text answer to the question,
the third model to identify the specific intent included in a plurality of intents and determine the text answer from a plurality of template text answers that correspond with the specific intent;

provide one or more action classes in placeholders associated with the text answer to generate a modified text answer,
the one or more action classes to act as a wraparound logic and provide an interface for receiving information;
add additional user information, associated with a user of the client device, to the modified text answer to generate a personalized text response to the question;
update the second panel with the personalized text response to generate an updated second panel,
wherein the first panel and the updated second panel form an updated dual-panel user interface; and
provide the updated dual-panel user interface to the client device.

8. The device of claim 7, wherein the user interaction includes one or more of:
the user of the client device interacting with the first panel via a first gesture,
the user of the client device interacting with the first panel via an input component of the client device,
the user of the client device providing a first voice input via the first panel,
the user of the client device interacting with the second panel via a second gesture,
the user of the client device inputting a query via the second panel, or
the user of the client device providing a second voice input via the second panel.

9. The device of claim 7, wherein, when the request for the content includes information indicating that the user of the client device desires to be guided, the one or more processors are further to:
generate the dual-panel user interface based on the information indicating that the user of the client device desires to be guided.

10. The device of claim 7, wherein, when the request for the content includes a query provided by the user of the client device, the one or more processors are further to:
generate the dual-panel user interface based on the query provided by the user of the client device.

11. The device of claim 7, wherein the one or more processors are further to:
receive, from the client device, a request to speak with a live person; and
connect the client device and another client device associated with the live person, via a call, based on the request to speak with the live person.

12. The device of claim 11, wherein the one or more processors are further to:
provide, to the other client device associated with the live person, information received via the first panel and the second panel of the dual-panel user interface.

13. The device of claim 7, wherein the one or more processors are further to:
determine the plurality of template text answers for the plurality of intents.

14. A non-transitory computer-readable medium storing instructions, the instructions comprising:
one or more instructions that, when executed by one or more processors, cause the one or more processors to:
provide, to a client device, a dual-panel user interface that includes:
a first panel for displaying content, and
a second panel for displaying a text conversation;
receive, from the client device, information indicating a user interaction with the first panel or the second panel;
process the information indicating the user interaction, with a first machine learning model, to determine a question based on the user interaction;
utilize natural language processing with the question to determine a specific intent of the question;
process the specific intent of the question, with a second machine learning model, to map the specific intent of the question to a content answer to the question and a text answer to the question,
the second machine learning model to identify the specific intent included in a plurality of intents and determine the content answer from a plurality of template content answers that correspond with the specific intent;
provide one or more action classes in placeholders associated with the content answer to generate a modified content answer,
the one or more action classes to act as a wraparound logic and provide an interface for receiving information;
add additional user information, associated with a user of the client device, to the modified content answer to generate a personalized content response to the question;
add the additional user information to the text answer to generate a personalized text response to the question;
update the first panel with the personalized content response to generate an updated first panel,
update the second panel with the personalized text response to generate an updated second panel,
wherein the updated first panel and the updated second panel form an updated dual-panel user interface; and
provide the updated dual-panel user interface to the client device.

15. The non-transitory computer-readable medium of claim 14, wherein the first panel of the dual-panel user interface is designed to permit the user of the client device to interact with the first panel of the dual-panel user interface, and
wherein the second panel of the dual-panel user interface is designed to permit the user of the client device to provide queries via the second panel of the dual-panel user interface.

16. The non-transitory computer-readable medium of claim 14, wherein the instructions further comprise:
one or more instructions that, when executed by the one or more processors, cause the one or more processors to:
provide the one or more action classes in placeholders associated with the text answer to generate a modified text answer,
wherein the one or more instructions, that cause the one or more processors to add the additional user information to the text answer, cause the one or more processors to:
add the additional user information to the modified text answer, via the action classes, to generate the personalized text response to the question.

17. The non-transitory computer-readable medium of claim 14, wherein the instructions further comprise:

one or more instructions that, when executed by the one or more processors, cause the one or more processors to:
    determine a plurality of template text answers for the plurality of intents,
        wherein the text answer is included in the plurality of template text answers.

18. The non-transitory computer-readable medium of claim 14, wherein the instructions further comprise:
one or more instructions that, when executed by the one or more processors, cause the one or more processors to:
    receive information indicating that the user of the client device desires to be guided; and
    generate the dual-panel user interface based on the information indicating that the user of the client device desires to be guided.

19. The non-transitory computer-readable medium of claim 14, wherein the instructions further comprise:
one or more instructions that, when executed by the one or more processors, cause the one or more processors to:
    receive a query provided by the user of the client device; and
    generate the dual-panel user interface based on receiving the query provided by the user of the client device.

20. The method of claim 1, wherein the second machine learning model to determine a text answer from a plurality of template text answers that correspond with the specific intent.

\* \* \* \* \*